(12) United States Patent
Bourd et al.

(10) Patent No.: US 11,508,109 B2
(45) Date of Patent: Nov. 22, 2022

(54) METHODS AND APPARATUS FOR MACHINE LEARNING RENDERING

(71) Applicant: QUALCOMM Incorporated, San Diego, CA (US)

(72) Inventors: Alexei Vladimirovich Bourd, San Diego, CA (US); Reza Pourreza Shahri, San Diego, CA (US); Dam Backer, San Diego, CA (US); Brian Ellis, San Diego, CA (US); Roman Larionov, San Diego, CA (US); Li He, San Diego, CA (US); Vaibhav Rajesh Gandhi, San Diego, CA (US); Shuaib Arshad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 16/836,030

(22) Filed: Mar. 31, 2020

(65) Prior Publication Data

US 2020/0388022 A1    Dec. 10, 2020

Related U.S. Application Data

(60) Provisional application No. 62/859,632, filed on Jun. 10, 2019.

(51) Int. Cl.
| | |
|---|---|
| *G06T 15/00* | (2011.01) |
| *G06T 7/00* | (2017.01) |
| *G06T 5/00* | (2006.01) |
| *G06T 1/20* | (2006.01) |
| *G06T 11/40* | (2006.01) |
| *G06N 5/04* | (2006.01) |

(Continued)

(52) U.S. Cl.
CPC ............. *G06T 15/00* (2013.01); *G06N 3/084* (2013.01); *G06N 5/046* (2013.01); *G06N 20/00* (2019.01); *G06T 1/20* (2013.01); *G06T 5/00* (2013.01); *G06T 7/0002* (2013.01); *G06T 11/40* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2019/0005713 A1* | 1/2019 | Nevraev | G06T 17/10 |
| 2020/0051290 A1* | 2/2020 | Yang | G06T 5/003 |
| 2020/0211157 A1* | 7/2020 | Pohl | G06T 15/06 |

* cited by examiner

*Primary Examiner* — Nurun Flora
(74) *Attorney, Agent, or Firm* — Campbell C. Chiang; Procopio, Cory, Hargreaves & Savitch LLP

(57) ABSTRACT

The present disclosure relates to methods and apparatus for graphics processing. The apparatus can obtain at least one input image including a plurality of pixels. Additionally, the apparatus can determine shading information for each of the plurality of pixels in the at least one input image. The apparatus can also determine a shading map based on the determined shading information for each of the plurality of pixels in the at least one input image. In some aspects, the apparatus can generate at least one output image based on the at least one input image and the determined shading map. The apparatus can also enhance a quality of the at least one output image. In some aspects, the quality of the at least one output image can be enhanced based on machine learning. Further, the apparatus can generate the at least one input image including the plurality of pixels.

30 Claims, 8 Drawing Sheets

(51) Int. Cl.
*G06N 20/00* (2019.01)
*G06N 3/08* (2006.01)

METHODS AND APPARATUS FOR MACHINE LEARNING RENDERING

CROSS REFERENCE TO RELATED APPLICATION(S)

This application claims the benefit of U.S. Provisional Application Ser. No. 62/859,632, entitled "METHODS AND APPARATUS FOR MACHINE LEARNING RENDERING" and filed on Jun. 10, 2019, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU). In some aspects, the apparatus can obtain at least one input image including a plurality of pixels. Additionally, the apparatus can determine shading information for each of the plurality of pixels in the at least one input image. The apparatus can also determine a shading map based on the determined shading information for each of the plurality of pixels in the at least one input image. Also, the apparatus can generate at least one output image based on the at least one input image and the determined shading map. In some aspects, the apparatus can render the at least one output image at a renderer based on the at least one input image and the determined shading map. The apparatus can also enhance a quality of the at least one output image. In some aspects, the quality of the at least one output image can be enhanced based on machine learning. Further, the quality of the at least one output image can be enhanced based on machine learning at a deep neural network (DNN) component. Also, the shading information for each of the plurality of pixels in the at least one input image can be determined based on machine learning, e.g., at a DNN component.

The apparatus can also generate the at least one input image including the plurality of pixels. In some aspects, the at least one input image can include a low resolution. Moreover, the at least one input image can be based on at least one previously rendered image. The at least one input image can also be based on at least one depth map. In some aspects, the determined shading information for each of the plurality of pixels can include at least one of depth information, normal information, texture information, a per-pixel texture identification, or light visibility information. Additionally, the determined shading information for each of the plurality of pixels can include a rendering quality for the pixel based on the at least one input image. Further, the determined shading map can include a shading rate for each of the plurality of pixels based on variable rate shading (VRS). In some aspects, the shading information for each of the plurality of pixels can be determined in a graphics processing pipeline of a GPU. Also, the shading information for each of the plurality of pixels can be determined at a central processing unit (CPU).

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
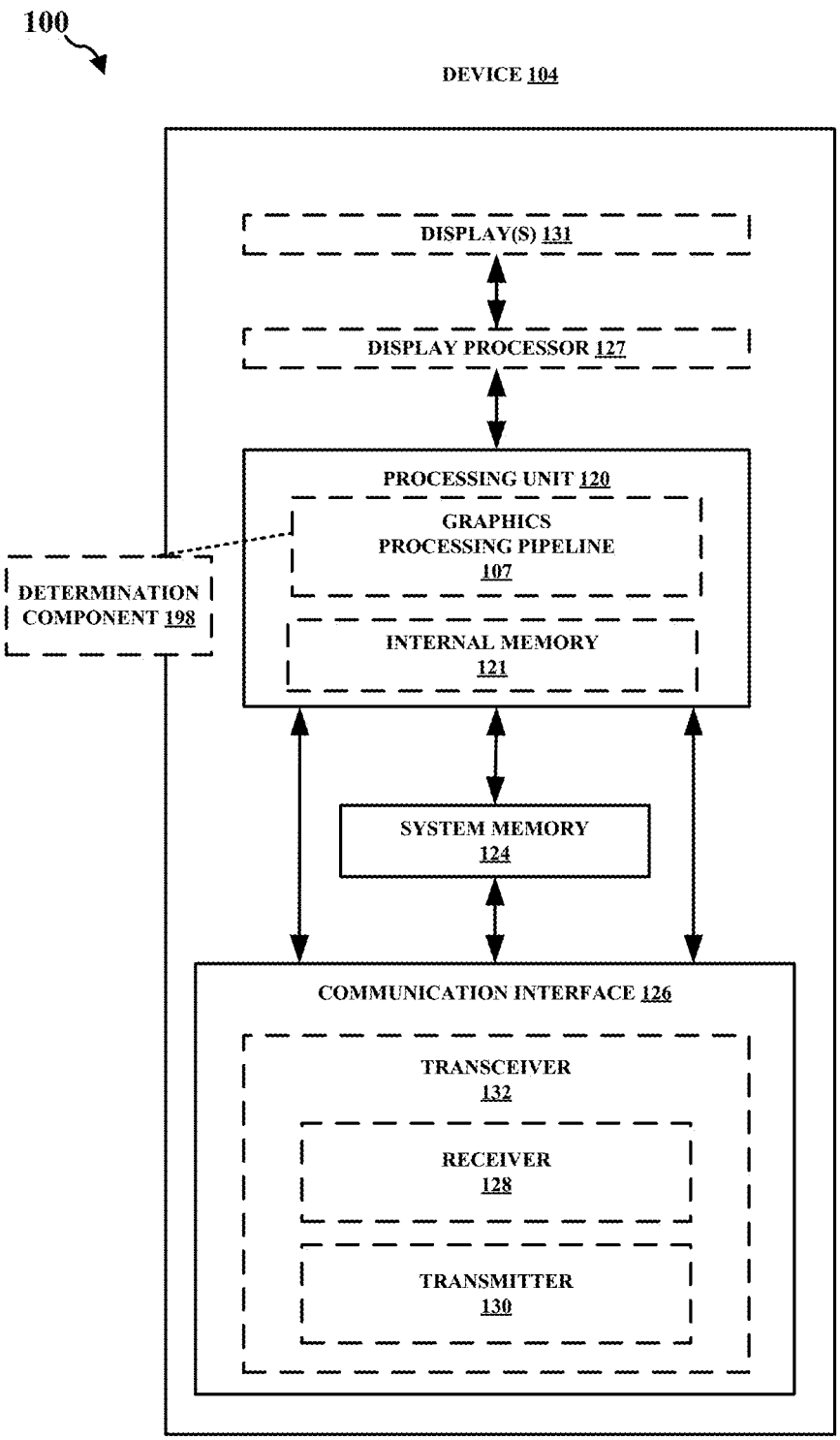
FIG. 1 is a block diagram that illustrates an example content generation system in accordance with one or more techniques of this disclosure.

Aspects of the present disclosure can utilize machine learning to determine a VRS rate or shading rate. For example, aspects of the present disclosure can use a neural network, e.g., a DNN component, to determine a VRS rate for a GPU. In some instances, the neural network can use machine learning to make decisions based on the predicted quality of the output image, as well as the computational power to render the image. By doing so, the present disclosure can generate a high quality image by utilizing a low power consumption and/or a fast rendering time. As such, aspects of the present disclosure can include the benefit or advantage of rendering high quality images at a fast rate and save power in the process.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software.

Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to obtain at least one input image including a plurality of pixels. The determination component 198 can also be configured to determine shading information for each of the plurality of pixels in the at least one input image. Additionally, the determination component 198 can be configured to determine a shading map based on the determined shading information for each of the plurality of pixels in the at least one input image. The determination component 198 can also be configured to generate at least one output image based on the at least one input image and the determined shading map. The determination component 198 can also be configured to render the at least one output image at a renderer based on the at least one input image and the determined shading map. Further, the determination component 198 can be configured to enhance a quality of the at least one output image. The determination component 198 can also be configured to generate the at least one input image including the plurality of pixels.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein.

Figure 2:
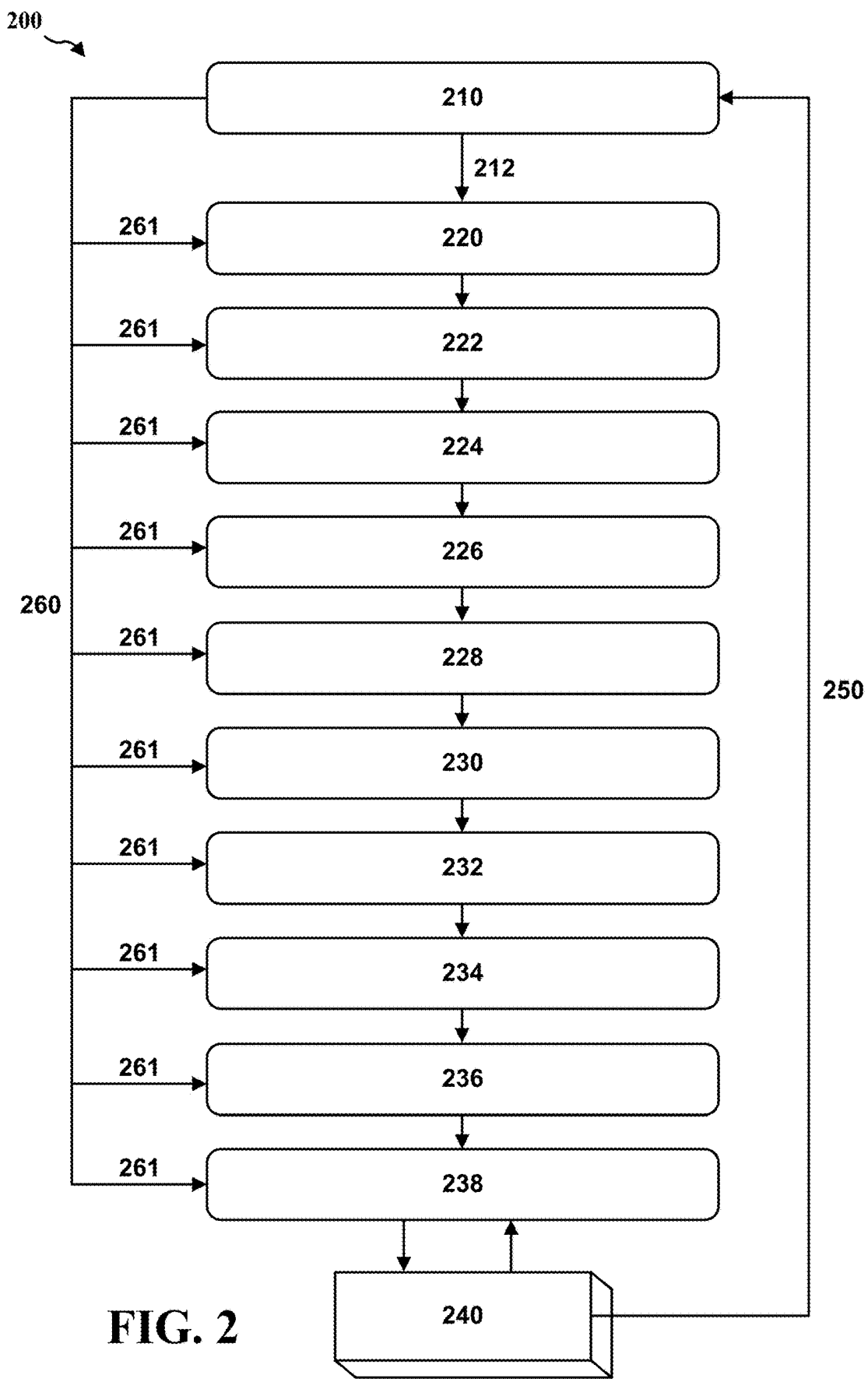
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, vertex fetcher (VFD) 220, vertex shader (VS) 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

GPUs herein can process multiple types of data in a GPU pipeline. For instance, in some aspects, a GPU can process two types of data or data packets, e.g., context register packets and draw call data. As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured as follows: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different shapes or primitives can be shaded in certain bins, e.g., using draw calls.

Graphics processing methods can be performed for a variety of different applications or purposes. For instance, graphics processing can be performed for gaming or video applications. In some instances, graphics processing may be performed in a photorealistic manner, where the resulting image is of high quality and exhibits photorealism. However, generating or rendering a photorealistic image through graphics processing can be an expensive and/or time consuming process. For instance, in order to generate or render photorealistic images, a GPU may need a high amount of power or computational capacity, e.g., in one or more processors. These power and/or computational benchmarks can lead to a trade off in GPU performance versus the quality of the rendered image.

Variable rate shading (VRS) is a rendering technique that reduces the amount of rendering calculations, e.g., by applying a varying amount of processing power to different areas of an image. For instance, VRS can vary the number of pixels that can be processed during a pixel shading operation. In some instances, VRS can result in performing shading calculations and rendering for certain portions of an image. For example, VRS may allocate the rendering performance or power at varying rates across an image. In some aspects, VRS may enable shading to be performed at a frequency that is coarser than a pixel. Indeed, by utilizing VRS a group of pixels may be shaded as a single unit.

VRS can be applied to a number of different applications. For example, VRS can apply to virtual reality (VR) or augmented reality (AR) applications. In VR or AR applications, a small area of the human eye may view images in high resolution, so VRS may render a small portion of an image in high resolution. Accordingly, pixels may be shaded in a small area of an image and then upscaled into a larger area. The VRS technique can also apply to rendering or shading pixels at a GPU. For instance, GPUs may shade a small area or portion of an image in order to save on power or performance.

VRS can consider a variety of different aspects when determining how to perform shading. For instance, VRS can consider certain tiles, e.g., a group of pixels that share a same VRS rate, and/or the VRS rate for each pixel in order to determine how to perform shading. A VRS rate can also indicate how to divide a shading value or rate between a group of pixels. For example, if a VRS rate is 2×2 (4 pixels at a time) and a tile size is 8×8 (64 total pixels), then a GPU may process a shader on 16 samples of the 64 pixels. The GPU can share the returned color values, e.g., red/green/blue (RGB) value, among the 64 pixels. In contrast, if a VRS rate is 1×1, which can be a more standard way of rendering, for a tile size of 8×8, the GPU can process a shader 64 times, e.g., once for each pixel in the tile. Accordingly, increasing the VRS rate can conserve the amount of shader calculations, e.g., at a potential trade off with image quality.

In some aspects, the GPU hardware values for tile size can be 8×8 and 16×16, and the VRS rates can be 1×1, 1×2, 2×1, 2×2, 1×4, 4×1, 4×2, 2×4, or 4×4. Aspects of VRS can also preserve samples. For instance, this can be referred to as an 'edge preserving' aspect of VRS. Further, preserving samples can be the difference between scaling techniques, e.g., bin-based foveation. In some aspects of VRS, each block in a frame or image can indicate one tile, i.e., a group of pixels of 8×8 or 1×16, with the same VRS rate. Additionally, the color of a tile can indicate the VRS rate for that particular block. For example, red tiles may use VRS value of 4×4, i.e., every 4×4 group of pixels can share the same shader or shading value.

In some aspects, when VRS is enabled, a shader can be focused around the center of one or more pixels. For example, a shader can be run at the center of pixels that are grouped together. Once the shader's value is returned, the grouped pixels, e.g., a 2×2 block of pixels, may be populated using the returned value.

Figure 3B:
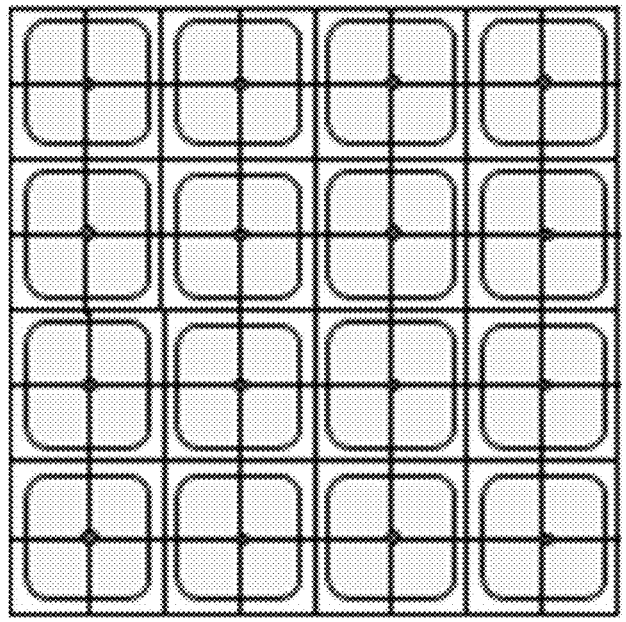
FIGS. 3A and 3B illustrate example blocks of pixels in accordance with one or more techniques of this disclosure.
Figure 3A:
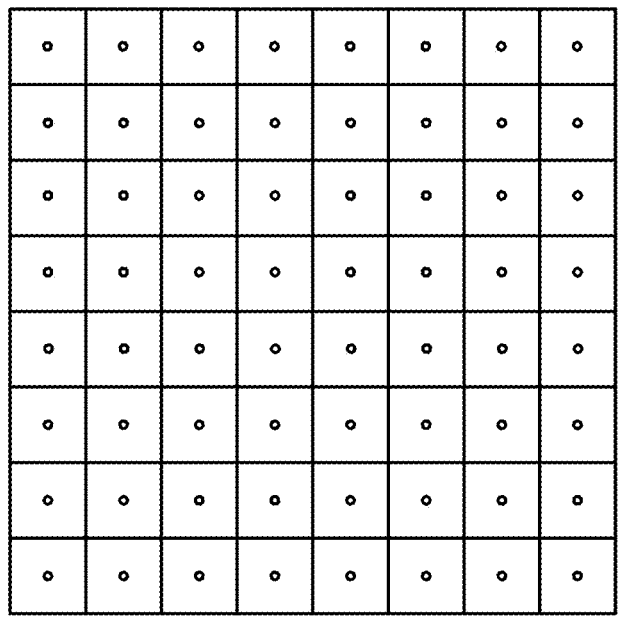

FIGS. 3A and 3B illustrate example blocks of pixels 300 and 350, respectively. FIG. 3A shows a VRS function of an 8×8 group of individual pixels. For instance, the VRS value in FIG. 3A is 1×1, where every pixel is rendered by running a shader at the pixel center. FIG. 3B shows a VRS function of 4×4 tiles, e.g., a 4×4 group of pixels. For instance, the VRS value in FIG. 3B is 2×2, where a shader is run at the center of the pixel group, e.g., a 2×2 group of pixels, and the result is copied into all four pixels in the 2×2 group.

Some aspects of VRS can utilize machine learning. As mentioned above, VRS can render at high rates, e.g., a rate of 1×1, when needed. In other scenarios, where there are not many details or blurred details in an image, it may be more optimal to render at lower rates, e.g., rates other than 1×1. For instance, a uniform portion or a motion-blurred portion of a frame may utilize rates lower than 1×1. For example, if a certain portion of an image is primarily a single color, e.g., brown, the GPU may not have to render every pixel of that color. Rather, the GPU may render based on certain pixel grouping, e.g., every other pixel, and spread the color to the neighboring pixels without much image degradation. In some aspects, if an image contains a lot of details, the VRS rate may be set to 1×1. By doing so, aspects of the present disclosure can avoid potential image degradation, such as by using higher VRS rates. Also, if a color is shared between pixels, this can cause unwanted artifacts.

In some aspects, instead of relying on the application to signal a VRS setting to the GPU, aspects of the present disclosure can utilize machine learning to determine a VRS rate or shading rate. For example, aspects of the present disclosure can use a neural network, e.g., deep neural network (DNN) component, to make a VRS rate decision for the GPU. In some aspects, the VRS can be a function with a final set of values, while the machine learning or neural network may need a differential of the function. In some instances, the neural network can use machine learning to make decisions based on the predicted quality of the output image, as well as the computational power to render the image. By doing so, the present disclosure can generate a high quality image by utilizing a low power consumption and/or a fast rendering time. Accordingly, aspects of the present disclosure can include the benefit or advantage of rendering high quality images quickly and while saving power.

As mentioned above, aspects of the present disclosure can save power by rendering certain portions of an image at a low resolution. For instance, certain portions of an image may be rendered at a high resolution while other portions may be rendered at a low resolution. Aspects of the present disclosure can upscale the low resolution portions of the image in order to save power. Accordingly, the present disclosure can determine which portions of an image are low resolution, so these portions can be upscaled to save power and still result in a high quality rendered image. Upscaling the low resolution portions of an image can also save battery life and cause the GPU to run faster. As further indicated herein, aspects of the present disclosure can utilize machine learning to accomplish the power savings.

Aspects of the present disclosure can also replace an application driven image based VRS approach with a machine learning based VRS approach. Accordingly, rather than relying on the application to signal the VRS setting to the GPU, the present disclosure can utilize machine learning or a neural network to make that decision. The machine learning VRS methods herein can make decisions based on the predicted quality of the output image, as well as the computational power to render the image and attempt to generate a high quality image with a low power consumption.

In some aspects, GPUs herein can generate a low resolution image, e.g., a 64×64 image, including a number of different channels, e.g., depth buffer or normal channels, or resolution information. These channels or information may be used as an input into the machine learning unit or DNN. The machine learning unit or DNN can utilize machine learning to determine the resolution information. In turn, the machine learning unit or DNN can output an image of a shading map or importance map. This shading map or importance map can also encode VRS rates. Also, the shading map or importance map can be fed to the GPU, which can in turn generate the output image in a desired resolution, e.g., 1920×1080.

Figure 4B:
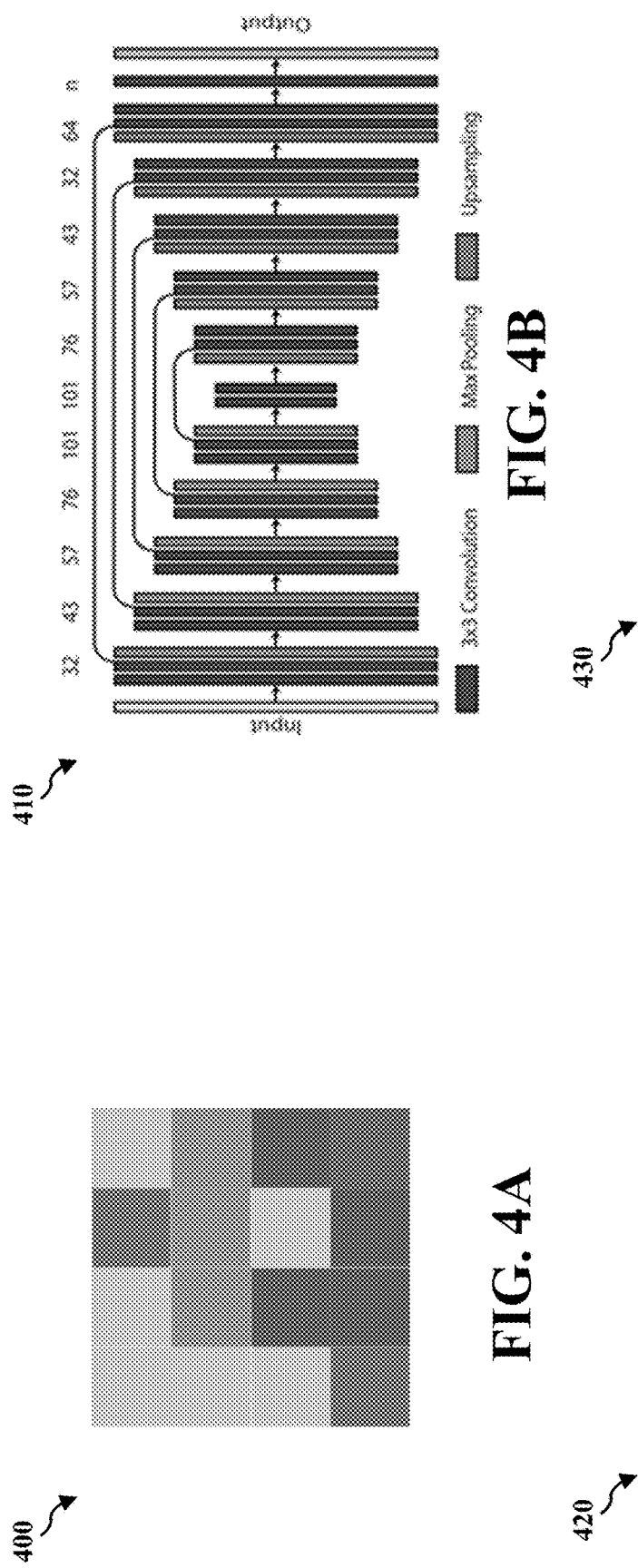
FIGS. 4A-4D illustrate example images in accordance with one or more techniques of this disclosure.
Figure 4D:
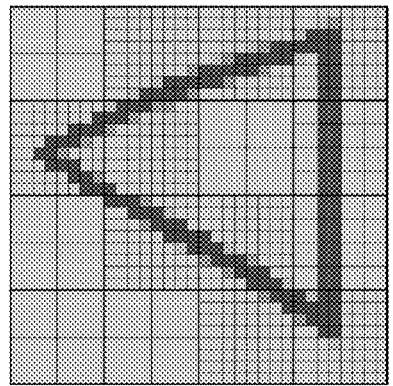
Figure 4A:
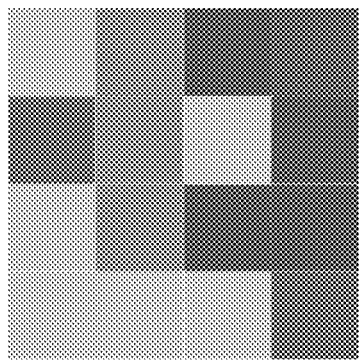
Figure 4C:
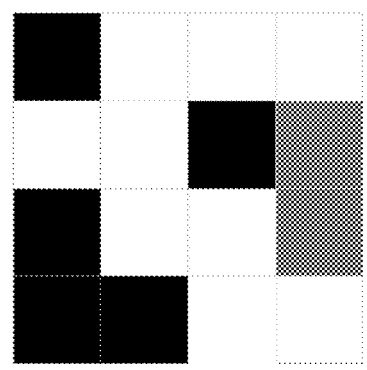

FIGS. 4A-4D illustrate image 400, DNN 410, image 420, and image 430, respectively, in accordance with one or more techniques of this disclosure. FIGS. 4A-4D illustrate the aforementioned process of using machine learning for VRS. For instance, image 400 in FIG. 4A displays an input or low resolution image, e.g., using 1 sample per bin. Image 400 can also be upsampled by a factor of tile size for visualization purposes. As shown in FIG. 4B, aspects of the present disclosure can then use the low resolution input image at a machine learning unit or DNN, e.g., DNN 410. Image 420 in FIG. 4C includes a number of VRS rates or shading information. For instance, in image 420, the black, gray, and white pixels can represent VRS rates of 4×4, 2×2, and 1×1, respectively. The present disclosure can also create an importance map that can determine the portion of an image that can utilize a low resolution during rendering. For example, the importance map can inform a GPU where it can save power by rendering with a low resolution. As mentioned above, this can be accomplished through machine learning in order to determine which portions of an image can utilize less computations during rendering. Additionally, aspects of the present disclosure can create an output or final image, e.g., output or final image 430 in FIG. 4D, by rendering a full-size image using the generated VRS rates.

As mentioned above, rendering can take a long period of time when an entire image is rendered at a high resolution. Accordingly, it can be beneficial to determine which areas of an image can be rendered at a low resolution. In some instances, it may take longer to render an image if the shading or importance map determines that a larger portion of the image may need to be rendered at a high resolution. Likewise, it may take less time if the shading or importance map determines that a smaller portion of the image may need to be rendered at a high resolution.

As mentioned herein, aspects of the present disclosure can take a pre-determined or input image, make some determinations based on shading information, and then render portions of an image at a low resolution. By doing so, the present disclosure can speed up the rendering process, as well as use less power. Aspects of the present disclosure can also make the rendering process more amenable to machine learning training, such that the GPU may render a small portion of an image at a high resolution. Further, with the use of a shading or importance map and the ability to render portions of the image at a low resolution, it can take a shorter amount of time for a GPU to render an entire image at a high quality. Accordingly, based on machine learning, aspects of the present disclosure can utilize portions of an input image, as well as a DNN, to generate a shading or importance map to render images at a lower resolution while still maintaining a high quality final or output image.

As mentioned above, aspects of the present disclosure can make the rendering process more efficient by utilizing machine learning. For instance, through machine learning, the present disclosure can identify areas of an image where the amount of rendering and the computational workload can be reduced. In some aspects, the present disclosure may perform a low resolution rendering by utilizing a ground truth with a high resolution. In these aspects, the present disclosure may pre-determine the ground truth image at a high resolution. By analyzing the information in the ground truth image, the present disclosure can determine a shading or importance map that can determine which portions of an image can be rendered utilizing a low resolution.

In some aspects, the present disclosure may render one pixel per multiple pixels or tiles and then group these multiple pixels or tiles together with some information. For example, this information can be depth information, normal vector information, texture information, and/or lighting information. By grouping these multiple pixels or tiles with the information, aspects of the present disclosure can machine learn, e.g., with a DNN, the portions of an image that can be rendered at a lower resolution. Accordingly, the DNN or neural network can determine the VRS rate for each tile or group of pixels. These VRS rates may then be used to render the image or frame. In some aspects, certain types of information, e.g., distortion loss or computational loss, can be beneficial to rendering an image. For example, distortion loss can help to maintain a high quality output image, and computational loss can help to keep the VRS rates low, e.g., the present disclosure may favor a 4×4 VRS rate over a 1×1 VRS rate.

Figure 5:
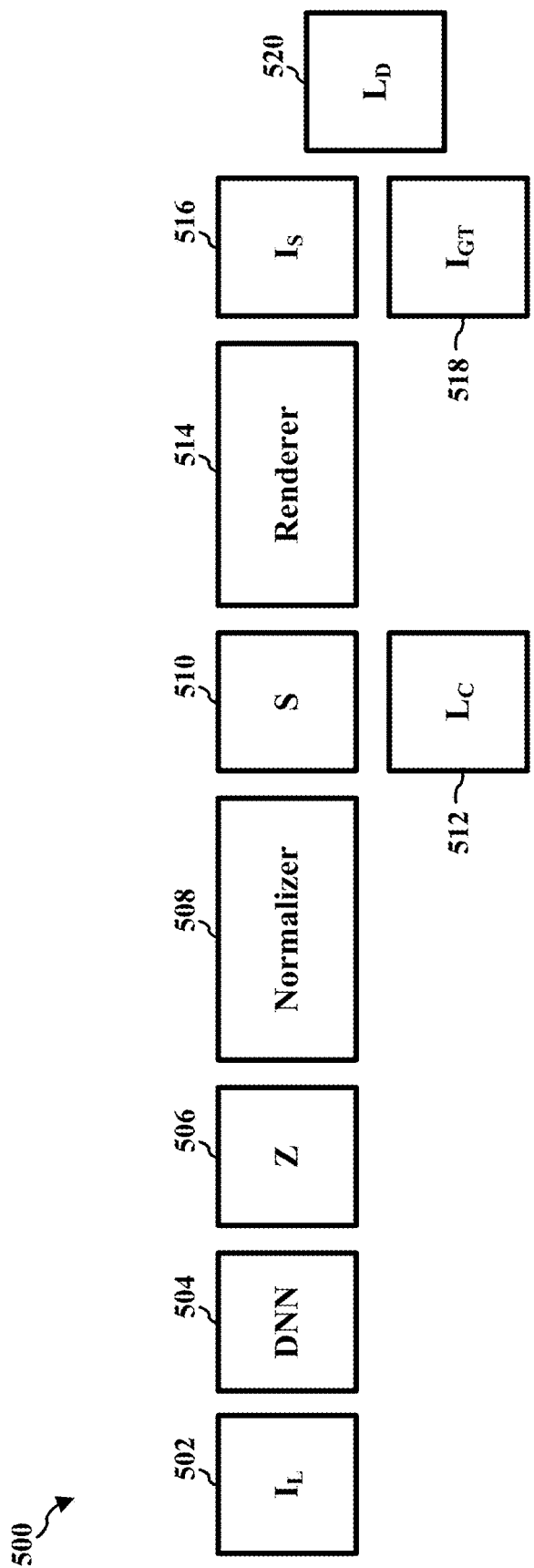
FIG. 5 illustrates an example block diagram in accordance with one or more techniques of this disclosure.

FIG. 5 illustrates a block diagram 500 in accordance with one or more techniques of this disclosure. Diagram 500 includes input image ($I_L$) 502, DNN 504, output (Z) 506, normalizer unit 508, rate map (S) 510, computational loss ($L_C$) 512, renderer 514, output image ($I_S$) 516, ground truth image ($I_{GT}$) 518, and distortion loss ($L_D$) 520. For instance, $I_L$ 502 can be a low resolution rendered image, e.g., with 1 sample per tile, Z 506 is the output of DNN 504, and normalizer unit 508 helps to normalize the output of DNN. Also, S 510 is a VRS rate map, $L_C$ 512 is the loss due to computation, renderer 514 generates or renders the output, and $I_S$ 516 is an output image that is generated or rendered. Further, $I_{GT}$ 518 is the ground truth image rendered at a VRS rate, e.g., a VRS rate of 1×1, and $L_D$ 520 is the loss due to distortion. $I_{GT}$ 518 can be generated at a GPU at full resolution, which can be used for comparison purposes. As $I_{GT}$ 518 can be the full or high resolution ground truth, this is the resolution that the machine learning simulation may aspire to achieve. Accordingly, aspects of the present disclosure can take the low resolution input image and compare it to the high resolution ground truth image, e.g., in order to determine the optimum shading or importance map.

As indicated herein, the present disclosure can include the normalizer unit 508 and/or the renderer 514 in order to avoid the long and expensive GPU rendering process. In some aspects, the renderer 514 may not be a traditional renderer at a GPU. For instance, the renderer or rendering apparatus 514 may take a shading or importance map and apply it to a pre-determined image, e.g., $I_L$ 502. Accordingly, rather than actually rendering the image, this renderer or rendering apparatus 514 may take the pre-determined or input image 502 and apply an importance map, and then down sample the image. Indeed, the present disclosure can process the input image quickly, and then perform adaptive down sampling on the input image, rather than performing the entire rendering process. As such, aspects of the present disclosure can simulate the rendering process, e.g., using machine learning, in order to speed up the rendering process.

As indicated above, the present disclosure can use machine learning to perform rendering training or a rendering simulation. In some aspects, the input image can be generated by the GPU at a low resolution and a high resolution, e.g., the ground truth image for comparison purposes. Aspects of the present disclosure can utilize a previously rendered image for the input image, as well as actually render the input image, or use a depth map to generate the input image. Accordingly, aspects of the present disclosure can determine the input image in a number of different manners. Thus, the present disclosure can simulate the rendering process, as well as actually perform a rendering process.

As shown in FIG. 5, the low resolution input image, $I_L$ 502, can utilize a resolution of as low as 1 pixel per tile. As such, the present disclosure can run one fragment shader per tile on the input image, which can be less than the amount of fragment shaders used by the final image, $I_S$ 516. As shown in FIG. 5, $I_L$ 502 can be fed to the DNN 504, and the DNN 504 can output Z 506, e.g., a continuous signal. In some aspects, DNN 504 can be adjustable or trainable. Additionally, aspects of the present disclosure can create VRS rates, e.g., S 510 with a rate of 1×1 or 2×2, based on the Z 506. In some instance, this is performed in the normalizer unit 508. As indicated above, S 510 can be the actual VRS rates. The present disclosure can directly feed the S 510 to the renderer 514 to generate the image $I_S$ 516. In aspects of the present disclosure that utilize a rendering simulation, S 510 can be fed to the renderer simulator. As mentioned above, the renderer 514 can either be a renderer or a renderer simulator. In aspects that utilize an actual renderer, the rendering process may be slower than the simulation rendering. Accordingly, using a renderer simulator can speed up the training process. In some aspects, the DNN 504, normalizer 508, and renderer 514 can be designed in a differentiable manner.

As shown in FIG. 5, the present disclosure can input $I_L$ 502 and output $I_S$ 516. Further, $I_{GT}$ 518 can be a rendered image at a high resolution, e.g., a ground truth image. The present disclosure can compare what image was rendered, e.g., $I_S$ 516, to what should be generated, e.g., $I_{GT}$ 518, in order to calculate a distortion loss, e.g., $L_D$ 520. Aspects of the present disclosure can also calculate a computation loss, e.g., $L_C$ 512, which the present disclosure can seek to minimize. Accordingly, the present disclosure may aim to minimize both $L_C$ 512 and $L_D$ 520.

In some aspects of the present disclosure, $I_L$ 502 can be generated and fed it to DNN 504, which can then result in Z 506. The present disclosure can then go through the normalizer unit 508 to get S 510, which can be sent to the renderer 514 to generate $I_S$ 516. Once $I_S$ 516 and S 510 are obtained, the present disclosure can calculate $L_C$ 512 and $L_D$ 520. Once the present disclosure has the calculations $L_C$ 512 and $L_D$ 520, the present disclosure can train or adjust the DNN 504 to maximize the efficiency of the DNN 504. Once the efficiency of the DNN 504 is maximized, the present disclosure can determine a shading or importance map. This shading or importance map can be used to efficiently render an image, e.g., at a GPU, by rendering at a low resolution in areas identified by the shading or importance map.

In some aspects, after the efficiency of the DNN has been maximized, the present disclosure can replace the renderer simulator, e.g., renderer 514, with an actual renderer. And once the present disclosure maximizes the DNN value and obtains an actual renderer, a final image can be rendered during the rendering process in the GPU hardware. Accordingly, aspects of the present disclosure can perform different simulation steps in order to machine learn an ideal DNN, and then perform the rendering based on the ideal DNN. In some aspects, the simulation can be performed using a simulation program. So some aspects of the present disclosure can perform these simulation programs in order to calculate the ideal DNN value, such that the present disclosure can use the ideal DNN when rendering at the GPU. By doing so, the present disclosure can generate or render a photorealistic image by rendering certain portions of the image at a low resolution. As such, aspects of the present disclosure can save power and/or render faster compared to traditional rendering at a GPU.

In some aspects, the rendering at the GPU can be performed after the present disclosure has simulated or machine learned the ideal DNN value, such as by determining a shading or importance map. As such, in some aspects, rendering the final image can be performed at a GPU, and determining the shading information and shading map can be performed in a simulation program. Thus, aspects of the present disclosure can perform multiple simulations in order to machine learn or determine shading information. This shading information can be used to generate or determine a shading or importance map. And the shading or importance map can be used to render a final image.

As mentioned herein, aspects of the present disclosure can reduce the amount of work performed at a GPU and produce a similar quality image, e.g., in less time and using less power. In some aspects, the present disclosure can perform the aforementioned simulations using a simulation software, e.g., run on a CPU or another device. Additionally, the initial input image, e.g., a low resolution image, can be determined or obtained in a number of different manners. For example, aspects of the present disclosure can generate the input image, receive the input image based on a previous image, and/or provide a depth map to determine the image. As mentioned herein, aspects of the present disclosure can use machine learning to determine a VRS map that maximizes rendering savings while minimizing the loss of image quality. In some aspects, the present disclosure can reduce the render quality of an image in exchange for reducing the amount of shading cycles, e.g., at a GPU. Additionally, in some aspects, machine learning can be applied to strike a balance between rendering savings and quality loss, e.g., based on minimal input information. For example, the VRS methods herein can reduce the amount of pixel shading in exchange for some quality loss. Aspects of the present disclosure can also utilize a method of driving VRS by means of a VRS image. Further, aspects of the present disclosure can optimize the relationship between rendering savings and image quality. In some aspects, the present disclosure can provide automated means to provide a VRS image which can take into account several factors, e.g., quality degradation, shading savings, and/or the minimal information available to generate the image. Moreover, aspects of the present disclosure can apply machine learning to generate a VRS image based on minimal information.

In some aspects, the VRS rates, e.g., at S 510, can be utilized in a VRS renderer, e.g., renderer 514, to generate the output frame, e.g., $I_L$ 516. Additionally, the DNN's output, e.g., Z 506, can be continuous while S 510, which contains valid VRS rates, e.g., 1×4 and 2×2, may be discrete. As such, aspects of the present disclosure can employ a discretization mechanism to account for this discrepancy. In some aspects, the discretization can be a non-differentiable process that can interrupt the backpropagation process. In other aspects, using an actual renderer, e.g., at renderer 514, may not be feasible as an actual renderer can slow down the simulation process. Additionally, this can interrupt the backpropagation process. Moreover, as mentioned above, the present solution can use a number of tile sizes, e.g., tiles of 8×8 or 16×16 block of pixels, or VRS rates, e.g., 1×1, 1×2, 2×1, 2×2, 1×4, 4×1, 4×2, 2×4, or 4×4 blocks of pixels.

Figure 6B:
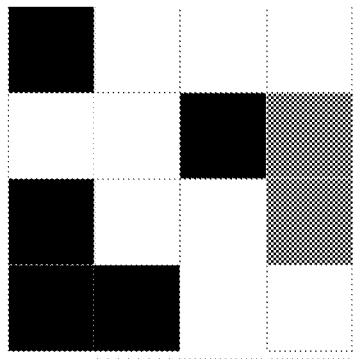
FIGS. 6A-6C illustrate example images in accordance with one or more techniques of this disclosure.
Figure 6C:
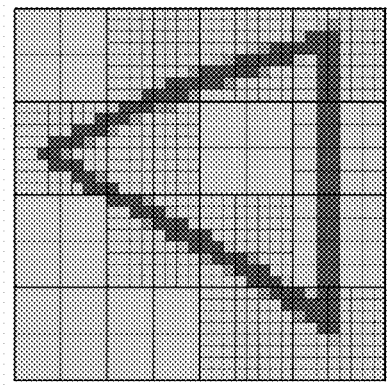
Figure 6A:
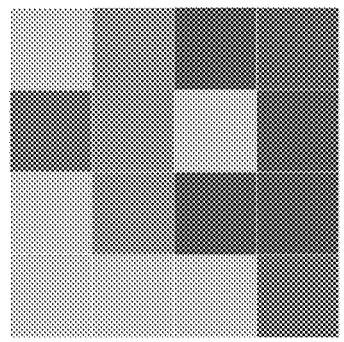

FIGS. 6A-6C illustrate images 600, 610, and 620, respectively, in accordance with one or more techniques of this disclosure. FIGS. 6A-6C display the images produced at different steps of the aforementioned simulation or rendering process. For instance, image 600 in FIG. 6A displays an input or low resolution image, e.g., using 1 sample per bin. Image 600 can also be upsampled by a factor of tile size for visualization purposes. Image 610 in FIG. 6B includes a number of VRS rates or shading information. For instance, in image 610, the black, gray, and white pixels can represent VRS rates of 4×4, 2×2, and 1×1, respectively. Image 620 in FIG. 6C is a full-size image rendered using the generated VRS rates.

In some aspects, to resolve any quality degradations, such as aliasing, the present disclosure can add a post-processing block or enhancer after the output image is rendered. In some aspects, the post-processing block or enhancer can be a machine learning unit or DNN. Additionally, the post-processing block or enhancer can be used to address a number of issues, such as anti-aliasing, quality enhancement, or super resolution.

Figure 7:
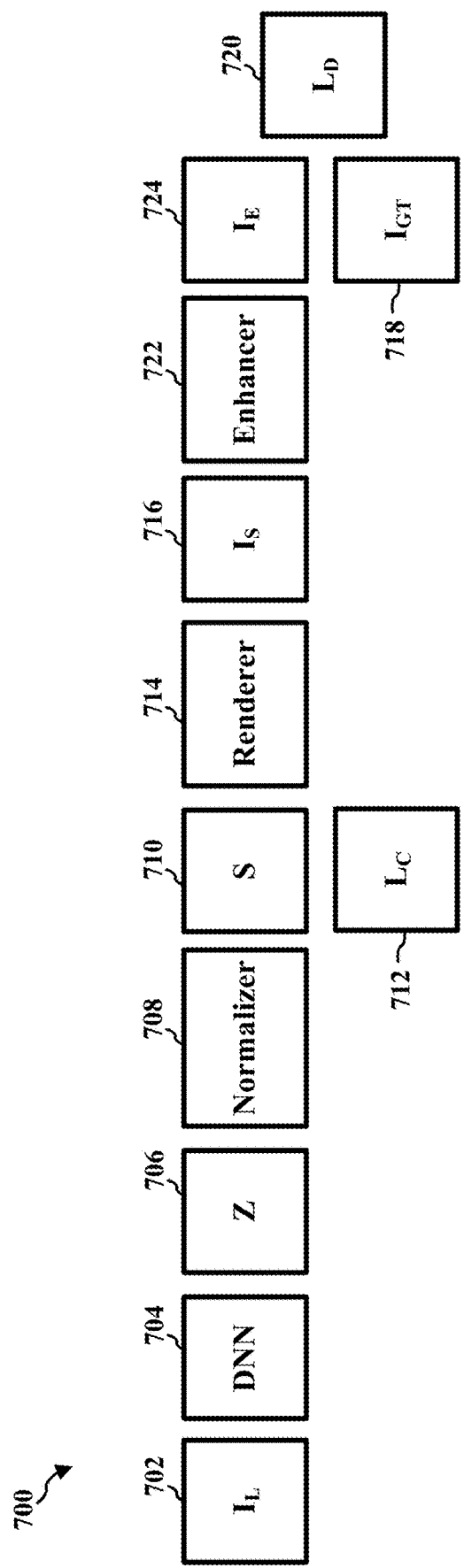
FIG. 7 illustrates an example block diagram in accordance with one or more techniques of this disclosure.

FIG. 7 illustrates a block diagram 700 in accordance with one or more techniques of this disclosure. Diagram 700 includes input image ($I_L$) 702, DNN 704, output (Z) 706, normalizer unit 708, rate map (S) 710, computational loss ($L_C$) 712, renderer 714, output image ($I_S$) 716, ground truth image ($I_{GT}$) 718, distortion loss ($L_D$) 720, enhancer 722, and enhanced image ($I_E$) 724. As indicated above, $I_L$ 702 is a low resolution rendered image, e.g., with 1 sample per tile, Z 706 is the output of DNN 704, and normalizer unit 708 helps to normalize the output of DNN. Additionally, S 710 is a VRS rate map, $L_C$ 712 is the loss due to computation, renderer 714 generates or renders the output, and $I_S$ 716 is an output image that is generated or rendered. Moreover, $I_{GT}$ 718 is the ground-truth image rendered at a VRS rate, e.g., VRS rate of 1×1, and $L_D$ 720 is the loss due to distortion. $I_{GT}$ 718 can be generated at a GPU at full resolution, which can be used for comparison purposes. As indicated above, $I_{GT}$ 718 can be the full or high resolution ground truth.

Enhancer 722 can be a machine learning block used to enhance the quality of $I_S$ 716. As mentioned above, $I_E$ 724 is the enhanced output. Accordingly, in some aspects, a machine learning block DNN can be used before rendering, as well as after rendering, e.g., enhancer 722. Accordingly, enhancer 722 can be a DNN. In some aspects, utilizing two DNNs, e.g., before and after renderer 714, may utilize less computational resources compared to a single DNN. The second DNN or enhancer 722 can clean up or enhance the quality of $I_S$ 716, such that it maximizes the efficiency of the first DNN, e.g., DNN 704. Thus, enhancer 722 can act as a second DNN and enhance the quality of the final image. Further, by using the enhancer 722, aspects of the present disclosure can use even lower VRS rates in the first DNN 704. As such, the enhancer 722 can help to tune the first DNN 704 to generate lower VRS rates.

FIG. 7 illustrates one example of the aforementioned process for determining shading information and/or a shading or importance map, in order to render an image using a low resolution. As shown in FIG. 7, aspects of the present disclosure, e.g., simulations or GPUs herein, can obtain at least one input image including a plurality of pixels, e.g., $I_L$ 702. Additionally, aspects of the present disclosure can determine shading information, e.g., Z 706, for each of the plurality of pixels in the at least one input image, e.g., $I_L$ 702. Aspects of the present disclosure can also determine a shading map based on the determined shading information, e.g., Z 706, for each of the plurality of pixels in the at least one input image, e.g., $I_L$ 702. Also, aspects of the present disclosure can generate at least one output image, e.g., $I_S$ 716, based on the at least one input image, e.g., $I_L$ 702, and the determined shading map.

In some aspects, the present disclosure can render the at least one output image, e.g., $I_S$ 716, at a renderer, e.g., renderer 714, based on the at least one input image, e.g., $I_L$ 702, and the determined shading map. Aspects of the present disclosure can also enhance a quality of the at least one output image, e.g., $I_S$ 716. In some aspects, the quality of the at least one output image, e.g., $I_S$ 716, can be enhanced based on machine learning. Further, the quality of the at least one output image, e.g., $I_S$ 716, can be enhanced based on machine learning at a DNN component, e.g., enhancer 722. Also, the shading information, e.g., Z 706, for each of the plurality of pixels in the at least one input image, e.g., $I_L$ 702, can be determined based on machine learning at a DNN component, e.g., DNN 704.

Aspects of the present disclosure can also generate the at least one input image, e.g., $I_L$ 702, including a plurality of pixels. In some aspects, the at least one input image, e.g., $I_L$ 702, can include a low resolution. Moreover, the at least one input image, e.g., $I_L$ 702, can be based on at least one previously rendered image. The at least one input image, e.g., $I_L$ 702, can also be based on at least one depth map. In some aspects, the determined shading information, e.g., Z 706, for each of the plurality of pixels can include at least one of depth information, normal information, texture information, a per-pixel texture identification, or light visibility information. Additionally, the determined shading information, e.g., Z 706, for each of the plurality of pixels can include a rendering quality for the pixel based on the at least one input image, e.g., $I_L$ 702. Further, the determined shading map can include a shading rate for each of the plurality of pixels based on VRS. In some aspects, the shading information, e.g., Z 706, for each of the plurality of pixels can be determined in a graphics processing pipeline of a GPU. Also, the shading information, e.g., Z 706, for each of the plurality of pixels can be determined at a CPU.

In some aspects, aspects of the present disclosure may use content-based VRS at the graphics application level. In particular, applications herein can track where various objects are located by maintaining bounding boxes around the objects. Thus, applications herein can apply different VRS factors for different areas of the screen or image by using knowledge about a particular object, e.g., a tree or a person, and track the location of the object bounding box on the screen or image. These methods can be utilized on large bounding boxes or small blocks of pixels, e.g., 8×8 pixels. In some aspects, it may be beneficial to determine whether the application was heavily CPU-bound or heavily GPU-bound. Furthermore, machine learning methods herein can guide VRS rendering and/or utilize de-noisers or adaptive sampling-map generators.

Aspects of the present disclosure can improve rendering performance of a graphics pipeline based on a number of different steps. For example, aspects of the present disclosure can utilize geometry and assets to produce low resolution or under-sampled rendering of a certain color and/or auxiliary per-pixel quantities, such as depth information, normal information, unlit texture information, per-pixel texture identifications, or light visibility information. Additionally, based on the information produced during the previous step, aspects of the present disclosure can use machine learning methods to create a shading or importance map. As mentioned above, the shading or importance map can be screen-based, e.g., per-pixel or per-block of pixels, values that determine a rendering quality of the corresponding pixel or block of pixels, e.g., based on the imagery. Further, the present disclosure can use the shading or importance map to perform adaptive rendering, where the application of the adaptive method can be guided by the corresponding setting from the shading or importance map.

In some aspects, the present disclosure can utilize variable rate shading as the adaptive technique. Further, the shading or importance map can contain a per-block of pixel rate for VRS. Also, aspects of the present disclosure can utilize mipmap bias as the adaptive technique, and the shading or importance map can contain a per-block of pixel bias to be applied to the texture mipmap selection. Aspects of the present disclosure can also be performed on a GPU or a device other than a GPU, as well as utilized different types of DNNs. Moreover, aspects of the present disclosure can adjust or train a DNN in order to avoid differentiating a graphics pipeline. The present disclosure can also generate a high resolution color image using a traditional graphics pipeline. Also, aspects of the present disclosure can implement a forward propagation technique to avoid rendering an image, i.e., to speed up the rendering process, by creating a resulting image from images based on the input image and the shading or importance map. Aspects of the present disclosure can also implement a number of different functions, e.g., backward propagation, a cost function, or an image error function.

Figure 8:
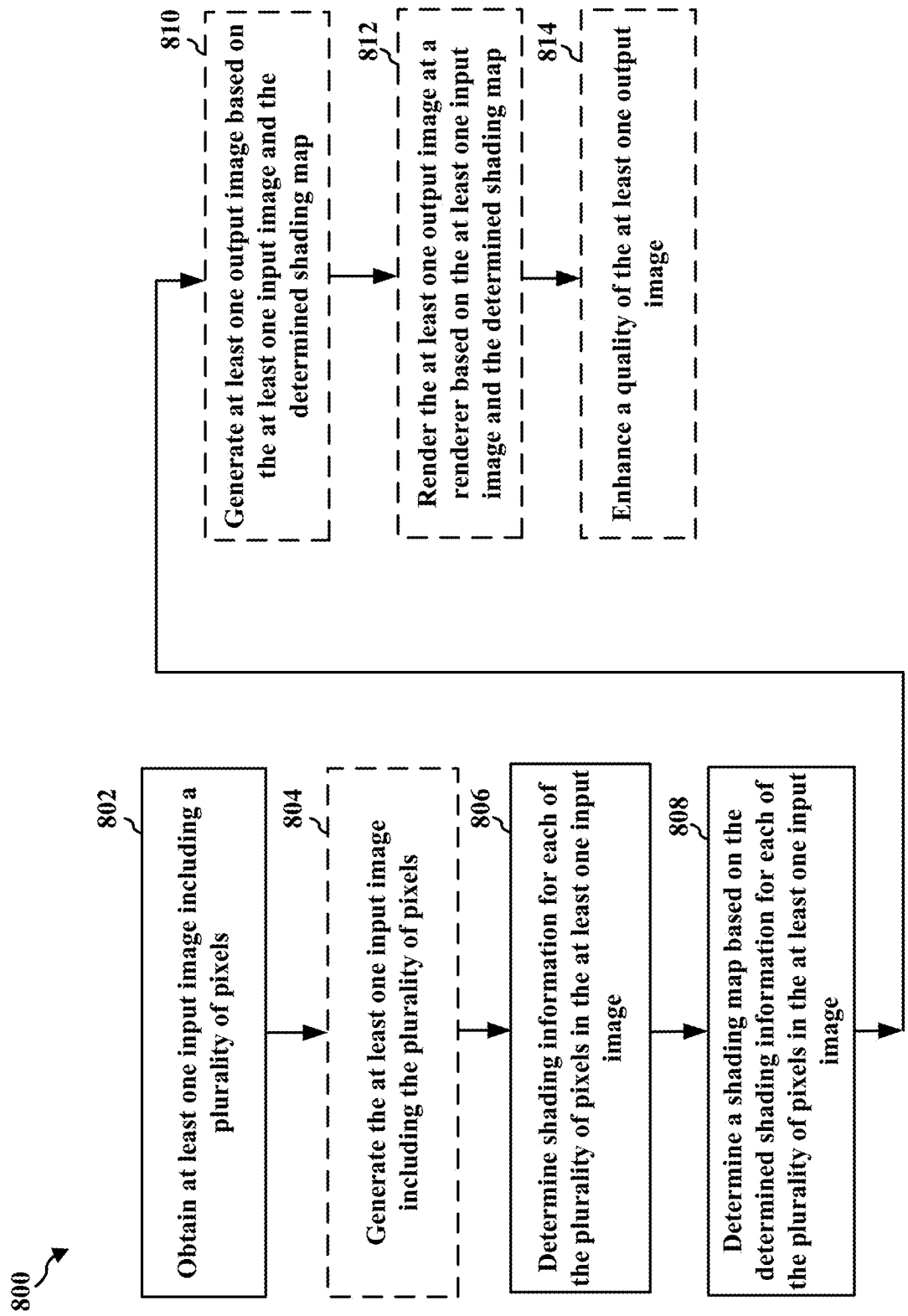
FIG. 8 illustrates an example flowchart of an example method in accordance with one or more techniques of this disclosure.

FIG. 8 illustrates an example flowchart 800 of an example method in accordance with one or more techniques of this disclosure. The method may be performed by a GPU or apparatus for graphics processing. At 802, the apparatus can obtain at least one input image including a plurality of pixels, as described in connection with the examples in FIGS. 3A, 3B, 4A-4D, 5, 6A-6C, and 7. At 804, the apparatus can generate the at least one input image including the plurality of pixels, as described in connection with the examples in FIGS. 3A, 3B, 4A-4D, 5, 6A-6C, and 7. At 806, the apparatus can determine shading information for each of the plurality of pixels in the at least one input image, as described in connection with the examples in FIGS. 3A, 3B, 4A-4D, 5, 6A-6C, and 7. Also, the shading information for each of the plurality of pixels in the at least one input image can be determined based on machine learning, e.g., at a DNN component, as described in connection with the examples in FIGS. 3A, 3B, 4A-4D, 5, 6A-6C, and 7. At 808, the apparatus can also determine a shading map based on the determined shading information for each of the plurality of pixels in the at least one input image, as described in connection with the examples in FIGS. 3A, 3B, 4A-4D, 5, 6A-6C, and 7.

At 810, the apparatus can also generate at least one output image based on the at least one input image and the determined shading map, as described in connection with the examples in FIGS. 3A, 3B, 4A-4D, 5, 6A-6C, and 7. At 812, the apparatus can render the at least one output image at a renderer based on the at least one input image and the determined shading map, as described in connection with the examples in FIGS. 3A, 3B, 4A-4D, 5, 6A-6C, and 7. At 814, the apparatus can enhance a quality of the at least one output image, as described in connection with the examples in FIGS. 3A, 3B, 4A-4D, 5, 6A-6C, and 7. In some aspects, the quality of the at least one output image can be enhanced based on machine learning, as described in connection with the examples in FIGS. 3A, 3B, 4A-4D, 5, 6A-6C, and 7. Further, the quality of the at least one output image can be enhanced based on machine learning at a DNN component, neural network component, or enhancer, as described in connection with the examples in FIGS. 3A, 3B, 4A-4D, 5, 6A-6C, and 7.

In some aspects, the at least one input image can include a low resolution, as described in connection with the examples in FIGS. 3A, 3B, 4A-4D, 5, 6A-6C, and 7. Moreover, the at least one input image can be based on at least one previously rendered image, as described in connection with the examples in FIGS. 3A, 3B, 4A-4D, 5, 6A-6C, and 7. The at least one input image can also be based on at least one depth map, as described in connection with the examples in FIGS. 3A, 3B, 4A-4D, 5, 6A-6C, and 7. In some aspects, the determined shading information for each of the plurality of pixels can include at least one of depth information, normal information, texture information, a per-pixel texture identification, or light visibility information, as described in connection with the examples in FIGS. 3A, 3B, 4A-4D, 5, 6A-6C, and 7.

Additionally, the determined shading information for each of the plurality of pixels can include a rendering quality for the pixel based on the at least one input image, as described in connection with the examples in FIGS. 3A, 3B, 4A-4D, 5, 6A-6C, and 7. Further, the determined shading map can include a shading rate for each of the plurality of pixels based on VRS, as described in connection with the examples in FIGS. 3A, 3B, 4A-4D, 5, 6A-6C, and 7. In some aspects, the shading information for each of the plurality of pixels can be determined in a graphics processing pipeline of a GPU, as described in connection with the examples in FIGS. 3A, 3B, 4A-4D, 5, 6A-6C, and 7. Also, the shading information for each of the plurality of pixels can be determined at a CPU, as described in connection with the examples in FIGS. 3A, 3B, 4A-4D, 5, 6A-6C, and 7.

In one configuration, a method or apparatus for graphics processing is provided. The apparatus may be a GPU or some other processor that can perform graphics processing. In one aspect, the apparatus may be the processing unit 120 within the device 104, or may be some other hardware within device 104 or another device. The apparatus may include means for obtaining at least one input image including a plurality of pixels. The apparatus may also include means for determining shading information for each of the plurality of pixels in the at least one input image. The apparatus may also include means for determining a shading map based on the determined shading information for each of the plurality of pixels in the at least one input image. Additionally, the apparatus may include means for generating at least one output image based on the at least one input image and the determined shading map. The apparatus may also include means for rendering the at least one output image at a renderer based on the at least one input image and the determined shading map. The apparatus may also include means for enhancing a quality of the at least one output image. Moreover, the apparatus may include means for generating the at least one input image including the plurality of pixels.

The subject matter described herein can be implemented to realize one or more benefits or advantages. For instance, the described graphics processing techniques can be accomplished at a low cost compared to other graphics processing techniques. Moreover, the graphics processing techniques herein can improve or speed up the data processing or execution of GPUs. Further, the graphics processing techniques herein can improve the resource or data utilization and/or resource efficiency in a GPU. Also, aspects of the present disclosure can mitigate or reduce the workload in a GPU, e.g., by avoiding rendering entire images at a high resolution. Accordingly, aspects of the present disclosure can render high quality images quickly and save power in doing so.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for graphics processing, comprising:
obtaining at least one input image including a plurality of pixels;
determining shading information for each of the plurality of pixels in the at least one input image based on machine learning; and
determining a shading map based on the determined shading information for each of the plurality of pixels in the at least one input image;
wherein the machine learning makes decisions based on predicted quality of at least one output image and computational power to render the at least one output image.

2. The method of claim 1, further comprising: generating the at least one output image based on the at least one input image and the determined shading map.

3. The method of claim 2, wherein generating the at least one output image based on the at least one input image and the determined shading map further comprises:
rendering the at least one output image at a renderer based on the at least one input image and the determined shading map.

4. The method of claim 2, further comprising:
enhancing a quality of the at least one output image.

5. The method of claim 4, wherein the quality of the at least one output image is enhanced based on machine learning.

6. The method of claim 5, wherein the quality of the at least one output image is enhanced based on machine learning at a deep neural network (DNN) component.

7. The method of claim 1, wherein the shading information for each of the plurality of pixels in the at least one input image is determined based on machine learning at a DNN component.

8. The method of claim 1, further comprising:
generating the at least one input image including the plurality of pixels.

9. The method of claim 1, wherein the at least one input image includes a low resolution.

10. The method of claim 1, wherein the at least one input image is based on at least one previously rendered image.

11. The method of claim 1, wherein the at least one input image is based on at least one depth map.

12. The method of claim 1, wherein the determined shading information for each of the plurality of pixels includes at least one of depth information, normal information, texture information, a per-pixel texture identification, or light visibility information.

13. The method of claim 1, wherein the determined shading information for each of the plurality of pixels includes a rendering quality for the pixel based on the at least one input image.

14. The method of claim 1, wherein the determined shading map includes a shading rate for each of the plurality of pixels based on variable rate shading (VRS).

15. The method of claim 1, wherein the shading information for each of the plurality of pixels is determined in a graphics processing pipeline of a graphics processing unit (GPU).

16. The method of claim 1, wherein the shading information for each of the plurality of pixels is determined at a central processing unit (CPU).

17. An apparatus for graphics processing, comprising:
a memory; and
at least one processor coupled to the memory and configured to:
obtain at least one input image including a plurality of pixels;
determine shading information for each of the plurality of pixels in the at least one input image based on machine learning; and
determine a shading map based on the determined shading information for each of the plurality of pixels in the at least one input image;
wherein the machine learning makes decisions based on predicted quality of at least one output image and computational power to render the at least one output image.

18. The apparatus of claim 17, wherein the at least one processor is further configured to: generate the at least one output image based on the at least one input image and the determined shading map.

19. The apparatus of claim 18, wherein to generate the at least one output image based on the at least one input image and the determined shading map includes the at least one processor further configured to:

render the at least one output image at a renderer based on the at least one input image and the determined shading map.

20. The apparatus of claim 18, wherein the at least one processor is further configured to:
enhance a quality of the at least one output image.

21. The apparatus of claim 20, wherein the quality of the at least one output image is enhanced based on machine learning.

22. The apparatus of claim 21, wherein the quality of the at least one output image is enhanced based on machine learning at a deep neural network (DNN) component.

23. The apparatus of claim 17, wherein the shading information for each of the plurality of pixels in the at least one input image is determined based on machine learning at a DNN component.

24. The apparatus of claim 17, wherein the at least one processor is further configured to:
generate the at least one input image including the plurality of pixels.

25. The apparatus of claim 17, wherein the at least one input image is based on at least one depth map.

26. The apparatus of claim 17, wherein the determined shading information for each of the plurality of pixels includes at least one of depth information, normal information, texture information, a per-pixel texture identification, or light visibility information.

27. An apparatus for graphics processing, comprising:
means for obtaining at least one input image including a plurality of pixels;
means for determining shading information for each of the plurality of pixels in the at least one input image based on machine learning; and
means for determining a shading map based on the determined shading information for each of the plurality of pixels in the at least one input image;
wherein the machine learning makes decisions based on predicted quality of at least one output image and computational power to render the at least one output image.

28. A computer-readable medium storing computer executable code for graphics processing, comprising code to:
obtain at least one input image including a plurality of pixels;
determine shading information for each of the plurality of pixels in the at least one input image based on machine learning; and
determine a shading map based on the determined shading information for each of the plurality of pixels in the at least one input image;
wherein the machine learning makes decisions based on predicted quality of at least one output image and computational power to render the at least one output image.

29. The method of claim 1, wherein the shading information for each of the plurality of pixels in the at least one input image is determined based on machine learning to reduce power consumption or increase rendering performance.

30. The apparatus of claim 17, wherein the shading information for each of the plurality of pixels in the at least one input image is determined based on machine learning to reduce power consumption or increase rendering performance.

* * * * *